(12) United States Patent
Sakamoto et al.

(10) Patent No.: US 10,647,167 B2
(45) Date of Patent: May 12, 2020

(54) PNEUMATIC TIRE

(71) Applicant: The Yokohama Rubber Co., LTD., Minato-ku, Tokyo (JP)

(72) Inventors: Hayato Sakamoto, Hiratsuka (JP); Atsushi Tanno, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 318 days.

(21) Appl. No.: 15/328,000

(22) PCT Filed: Jul. 22, 2015

(86) PCT No.: PCT/JP2015/070851
§ 371 (c)(1),
(2) Date: Jan. 20, 2017

(87) PCT Pub. No.: WO2016/013583
PCT Pub. Date: Jan. 28, 2016

(65) Prior Publication Data
US 2017/0166016 A1      Jun. 15, 2017

(30) Foreign Application Priority Data

Jul. 23, 2014   (JP) .................................. 2014-149459

(51) Int. Cl.
*B60C 19/00*      (2006.01)
*B29D 30/06*      (2006.01)
(Continued)

(52) U.S. Cl.
CPC ........ *B60C 19/001* (2013.01); *B29D 30/0061* (2013.01); *B29D 30/0681* (2013.01); *B60C 23/0493* (2013.01); *B29D 2030/0072* (2013.01)

(58) Field of Classification Search
CPC ........ B29D 2030/0072; B29D 30/0061; B29D 30/0681; B29C 73/10; B60C 19/001; B60C 23/0493
See application file for complete search history.

(56) References Cited

U.S. PATENT DOCUMENTS 4,285,382 A * 8/1981 DiRocco ................. B29C 73/10
                                                       152/367
6,217,683 B1   4/2001 Balzer et al.
(Continued)

FOREIGN PATENT DOCUMENTS

DE        30 03 666       8/1981
JP        2002-502765     1/2002
(Continued)

OTHER PUBLICATIONS

Machine translation of JP2012-240465 (no date).*
International Search Report for International Application No. PCT/JP2015/070851 dated Oct. 6, 2015, 4 pages, Japan.

*Primary Examiner* — Justin R Fischer
*Assistant Examiner* — Philip N Schwartz
(74) *Attorney, Agent, or Firm* — Thorpe North & Western

(57) ABSTRACT

A pneumatic tire includes a fastener disposed on a tire inner surface, the fastener being a first fastener of a separatable pair of mechanical fasteners and being composed of at least two fastener members. The at least two fastener members sandwich a rubber-coated fiber reinforced member and fix together. The fastener is disposed at a position such that a distance (D) in a tire width direction from a center position (C) of the fastener to a tire equator line (L) and a maximum width (W) of the tire satisfy a following relationship: $0 \leq D/W \leq 0.40$. The fiber reinforced member includes a plurality of fiber bundles disposed in alignment in at least one direction, a number of fiber bundles Y (bundles/50 mm width) per unit width of the fiber reinforced member being such that: $20 \leq Y$ (bundles/50 mm width) $\leq 90$.

13 Claims, 6 Drawing Sheets

(51) Int. Cl.
    *B60C 23/04*        (2006.01)
    *B29D 30/00*        (2006.01)

(56) References Cited

U.S. PATENT DOCUMENTS

| | | |
|---|---|---|
| 2003/0155054 A1 | 8/2003 | Bell |
| 2006/0260726 A1 | 11/2006 | Bell |
| 2010/0108222 A1 | 5/2010 | Bell |
| 2011/0113630 A1 | 5/2011 | Bell |
| 2012/0024439 A1 | 2/2012 | Tanno et al. |
| 2012/0248274 A1* | 10/2012 | Scheungraber ..... B60C 23/0493 248/309.1 |

FOREIGN PATENT DOCUMENTS

| | | |
|---|---|---|
| JP | 2005-517581 | 6/2005 |
| JP | 2006-044503 | 2/2006 |
| JP | 2007-062405 | 3/2007 |
| JP | 2009-298329 | 12/2009 |
| JP | 2012-025318 | 2/2012 |
| JP | 2012-240465 | 12/2012 |
| WO | WO 1999/41093 | 8/1999 |
| WO | WO 2000/47430 | 8/2000 |
| WO | WO 2003/070496 | 8/2003 |

* cited by examiner

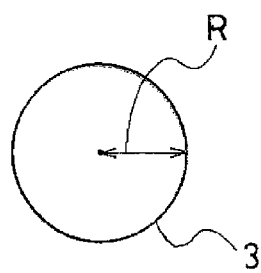 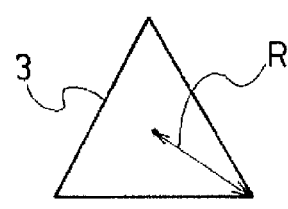 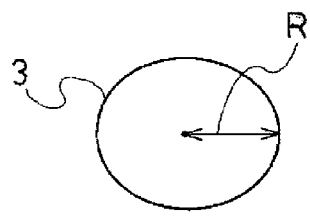
FIG. 7A    FIG. 7B    FIG. 7C
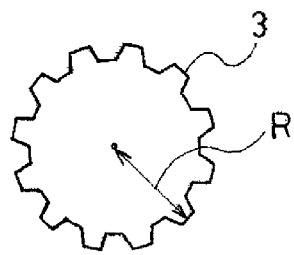
FIG. 7D

PNEUMATIC TIRE

TECHNICAL FIELD

The present technology relates to a pneumatic tire, and particularly relates to a pneumatic tire capable of retaining an object secured on an inner surface of the pneumatic tire.

BACKGROUND ART

In recent years, research and development into how to dispose an object having various specific functions on an inner surface of a pneumatic tire has been performed.

For example, attachment methods are known in which a tire tag (radio frequency identification tag), a chip, or a sound-absorbing member is attached to an innerliner of a green tire using a surface fastener such as a hook and loop fastener or a hook and hook fastener (Japanese Unexamined Patent Application Publication Nos. 2005-517581A and 2006-044503A).

The surface fasteners proposed in Japanese Unexamined Patent Application Publication Nos. 2005-517581A and 2006-044503A have preferred embodiments which exhibit relatively strong engagement force when attached, and engagement on a surface can be achieved regardless of some misalignment during the attaching operation. However, when subjected to high speed rolling motion in a state of relatively elevated temperatures, deformation and compaction is repeated over an extended period of time. As a result, partial physical deterioration in the surface fastener is produced. As this deterioration progresses, deterioration and decline over time of the engagement force of an entirety of the surface fastener occurs. This leads to difficulties in retaining a desired engagement force over an extended period of time.

In light of this, the present inventors have proposed a pneumatic tire which includes a separatable pair of mechanical fasteners, wherein a first fastener of the pair of separatable pair of mechanical fasteners is provided on a tire inner surface (Japanese Unexamined Patent Application Publication Nos. 2012-025318A and 2012-240465A). These pneumatic tires are free of the problems described above and in particular, the obtained engagement force is great and is essentially free of variations (positional variation within the tire and variation from tire to tire). Furthermore, the engagement force deteriorates/declines minimally over time due to extreme usage conditions including deformation and compaction caused by high speed tire rolling motion in a state of relatively elevated temperatures being repeated for an extended period of time; and the desired engagement force can be maintained over an extended period of time.

As an approach to an attachment method for one fastener to the tire inner surface which, the present inventors have proposed individually embedding the fasteners in a tread rubber and vulcanizing the tire, and a mechanical fastener composed of at least two fastener members that is a first mechanical fastener of a separatable pair of mechanical fasteners which is disposed on a tire inner surface, and the two fastener members form the first fastener of the pair of mechanical fastener on a tire inner surface by fixing together while sandwiching a rubber layer, which is a tire component, or a rubber-coated fiber reinforced member (Japanese Unexamined Patent Application Publication No. 2012-025318A). This approach is superior from the perspective of strength of obtained engagement force, variation in the strength of this force, and reliability of engaging operations.

The present inventors have also proposed that at least two fastener members are fixed together while sandwiching a woven fabric or nonwoven fabric made of fibers (Japanese Unexamined Patent Application Publication No. 2012-240465A).

However, with these approaches, depending on the form of the fastener and the position where it is attached, the desired attachment strength may not be obtained, and the durability may decrease.

It is desirable for the attachment strength of the mechanical fastener to be greater and have a longer lifetime so that it can have application to objects having a specific function disposed inside the tire that have certain characteristics (mass, size, form, and the like).

SUMMARY

The present technology provides a pneumatic tire in which the obtained engagement force is great and is essentially free of variations (positional variation within the tire and variation from tire to tire). Furthermore, the engagement force deteriorates/declines minimally over time due to extreme usage conditions including deformation and compaction caused by high speed tire rolling motion in a state of relatively elevated temperatures being repeated for an extended period of time. The pneumatic tire also includes a highly effective mechanical fastener disposed inside the pneumatic tire, with the attachment strength of the mechanical fastener to the tire inner surface being great, and a desired functional object having a specific function and certain characteristics (mass, size, form, and the like) being able to remain attached for an extended period of time.

A pneumatic tire of an embodiment of the present technology has configuration (1) below.

(1) A pneumatic tire, comprising:

a mechanical fastener disposed on a tire inner surface, the mechanical fastener being a first mechanical fastener of a separatable pair of mechanical fasteners and being composed of at least two fastener members; wherein a) the at least two fastener members sandwich a rubber-coated fiber reinforced member and fix together;

b) the mechanical fastener is disposed at a position such that a distance D (mm) in a tire width direction from a center position C of the mechanical fastener to a tire equator line L and a maximum width W (mm) of the tire satisfy a following relationship:

$0 \leq D/W \leq 0.40$; and c) the fiber reinforced member includes a plurality of fiber bundles disposed in alignment in at least one direction, a number of fiber bundles Y (bundles/50 mm width) per unit width of the fiber reinforced member being such that:

$20 \leq Y$ (bundles/50 mm width) $\leq 90$.

A pneumatic tire according to an embodiment of the present technology is preferably further configured as described in any one of (2) to (13) below.

(2) The pneumatic tire according to (1), wherein the fiber reinforced member is composed of fiber bundles with a fiber total cross-sectional area A (mm²/fiber bundle) per one fiber bundle such that:

$0.05 \leq A$ (mm²)/fiber bundle$\leq 1.20$.

(3) The pneumatic tire according to (1) or (2), wherein the fiber reinforced member is composed of fiber bundles with a Young's modulus of from 1 GPa to 15 GPa.

(4) The pneumatic tire according to any one of (1) to (3), wherein the fiber reinforced member is composed of a plurality of fiber bundles aligned in one direction.

(5) The pneumatic tire according to any one of (1) to (3), wherein the fiber reinforced member is composed of a plurality of fiber bundles aligned in at least two directions.

(6) The pneumatic tire according to (5), wherein a plurality of fiber reinforced members composed of a plurality of fiber bundles aligned in one direction are layered with the plurality of fiber bundles having intersecting alignment directions so as to have a configuration in which the fiber bundles are aligned in at least two directions.

(7) The pneumatic tire according to any one of (4) to (6), wherein the direction in which the fiber bundles in the fiber reinforced member are aligned forms an angle (minor angle θ) with a tire circumferential direction such that:

15 degrees≤θ≤75 degrees.

(8) The pneumatic tire according to any one of (1) to (7), wherein an average length L (mm) of the fiber bundles in the fiber reinforced member that pass through a fastener region where the fastener projects on the tire inner surface is such that:

15≤$L$ (mm)≤200.

(9) The pneumatic tire according to any one of (1) to (8), wherein a number of the fiber bundles in the fiber reinforced member that pass through the fastener region where the fastener projects on the tire inner surface is from 4 to 90.

(10) The pneumatic tire according to any one of (1) to (9), wherein the fiber reinforced member sandwiched between the at least two fastener members has a contour shape when viewed in a plan view without sharp corner portions, and is composed of a curved line with a radius of curvature of 5 mm or greater or composed of a combination of a curved line with a radius of curvature of 5 mm or greater and a straight line.

(11) The pneumatic tire according to any one of (1) to (10), wherein the contour shape of the fastener which projects on the tire inner surface has a distance R of from 2 mm to 60 mm, where R is a distance from a center of gravity position of the contour shape to a discretionary position on a line of the contour furthest away from the center of gravity position.

(12) The pneumatic tire according to any of (1) to (11), further comprising an object attached to a second fastener that engages with the first fastener on the tire inner surface, wherein the object is fixed on the tire inner surface by engaging the first fastener and the second fastener together.

(13) The pneumatic tire according to (12), wherein the object attached to the second fastener is one or a combination of two or more of (a) an electronic circuit comprising a sensor, (b) a balance weight, (c) a run-flat core, (d) an object on which an oxygen scavenger, a drying agent, and/or an ultraviolet light detecting color fixing agent is applied or mounted, (e) a noise absorbing member, and (f) a surface fastener member.

According to an embodiment of the present technology according to (1), a pneumatic tire can be achieved which includes a mechanical fastener with a great obtained engagement force and is essentially free of variations (positional variation within the tire and variation from tire to tire). Furthermore, the engagement force deteriorates/declines minimally over time due to extreme usage conditions including deformation and compaction caused by high speed tire rolling motion in a state of relatively elevated temperatures being repeated for an extended period of time, and thus the attachment strength of the mechanical fastener to the tire inner surface is great.

Thus, according to an embodiment of the present technology according to (1), with these effects a pneumatic tire can be achieved which includes a superior mechanical fastener inside the tire. The mechanical fastener can keep a desired functional object having a specific function and certain characteristics (mass, size, form, and the like) attached inside the tire for an extended period of time and thus keep the function working, without limiting the object in terms of certain characteristics.

According to the pneumatic tire according to embodiment of the present technologies according to any one of (2) to (11), a superior pneumatic tire which can achieve the effects of the technology according to (1) to a greater extent and with more reliability.

According to embodiment of the present technology according to (12) or (13), a novel pneumatic tire or a functional object attached to a novel pneumatic tire can be achieved in which a functional object having desired functionality can be attached to a tire inner surface with great engagement force and superior durability.

BRIEF DESCRIPTION OF DRAWINGS

FIGS. 7A to 7D are plan views for explaining preferred shapes of the mechanical fastener 3 able to be used in embodiments of the present technology, and in particular for explaining the contour shapes when the mechanical fastener is viewed in a plan view.

DETAILED DESCRIPTION

The pneumatic tire according to embodiments of the present technology is described in detail below with reference to the drawings.

Figure 1A:
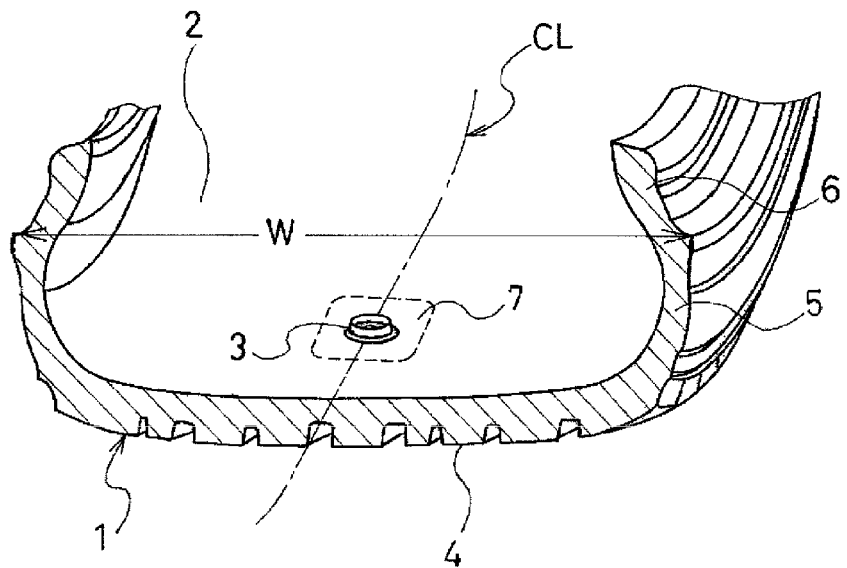
FIGS. 1A and 1B are cross-sectional perspective views of a portion of a pneumatic tire of an embodiment of the present technology.
Figure 1B:
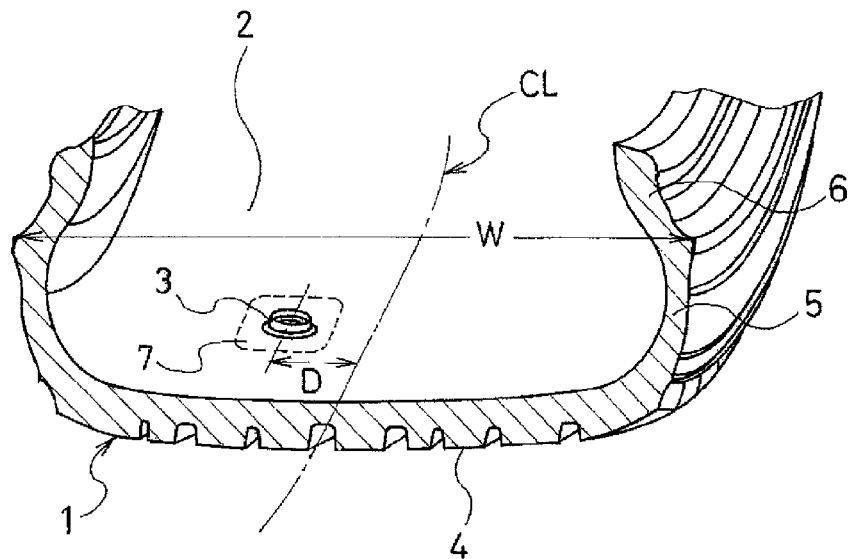

As illustrated in FIGS. 1A and 1B, a pneumatic tire 1 according to an embodiment of the present technology includes a mechanical fastener 3 on a tire inner surface 2. The mechanical fastener 3 is the first mechanical fastener 3 of a separatable pair of mechanical fasteners, and is composed of at least two fastener members 3a, 3b (see FIGS. 2A to 3B).

As illustrated in FIGS. 2A to 3B, a) the at least two fastener members 3a, 3b sandwich a rubber-coated fiber reinforced member 7 and fix together.

b) The mechanical fastener 3 is disposed at a position such that a distance D (mm) in a tire width direction from a center position C of the mechanical fastener 3 to a tire equator line CL and the maximum width W (mm) of the tire satisfy the following relationship:

$$0 \leq D/W \leq 0.40.$$

c) The fiber reinforced member 7 includes a plurality of fiber bundles 8 disposed in alignment in at least one direction. A number of fiber bundles Y (bundles/50 mm width) per unit width of the fiber reinforced member is such that:

$$20 \leq Y \text{ (bundles/50 mm width)} \leq 90.$$

In FIGS. 1A and 1B, 4 denotes a tread portion; 5 denotes a sidewall portion; and 6 denotes a bead portion.

Figure 2A:
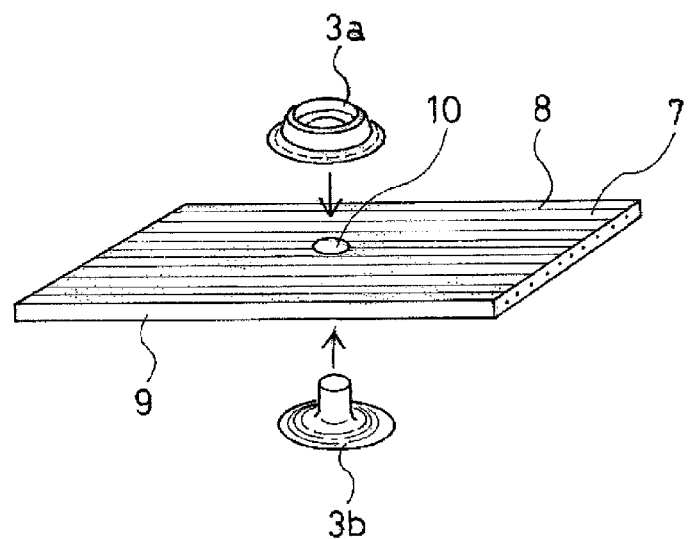
FIGS. 2A and 2B are perspective model diagrams for explaining a pneumatic tire of an embodiment of the present technology. The diagrams illustrate how two members that compose a first mechanical fastener of a separatable pair of mechanical fasteners used in a pneumatic tire of an embodiment of the present technology engage with each other while sandwiching a rubber-coated fiber reinforced member.
Figure 2B:
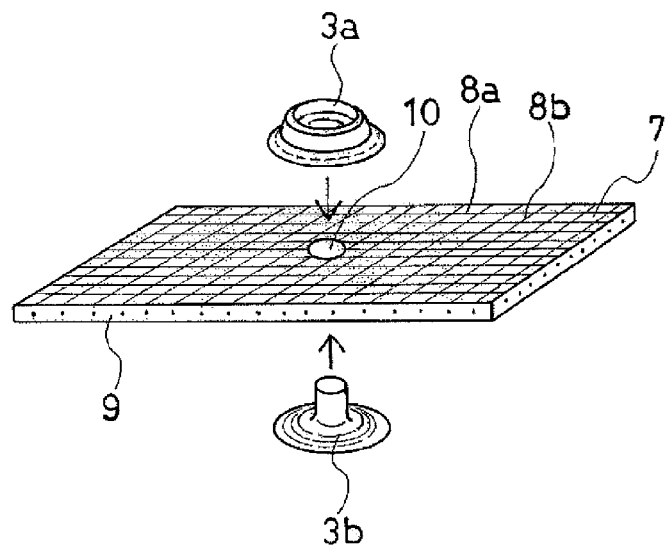

FIGS. 2A and 2B are perspective model diagrams for explaining the configuration of the two members 3a, 3b which compose the first mechanical fastener 3 of the separatable pair of mechanical fasteners of how they engage with each other while sandwiching a single rubber-coated fiber reinforced member 7. FIG. 2A illustrates the fiber reinforced member 7 in which the fiber bundles 8 are aligned in one direction and disposed in a rubber coating 9. FIG. 2B illustrates a single fiber reinforced member 7 with fiber bundles 8a, 8b in a two direction alignment configuration. In FIGS. 2A to 3B, 10 denotes a hole provided in the fiber reinforced member 7 for receiving the mechanical fastener 3.

Figure 3A:
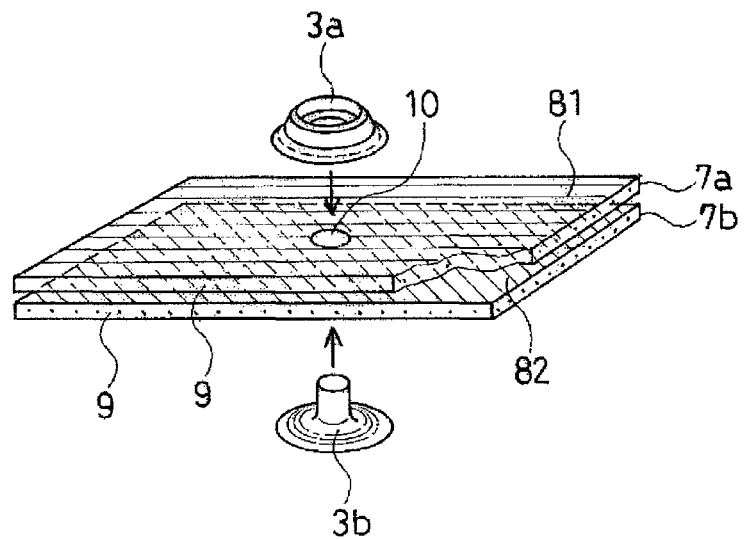
FIGS. 3A and 3B are partially fragmented perspective model diagrams for explaining a pneumatic tire of another embodiment of the present technology. The diagrams illustrate how two members that compose a first mechanical fastener of a separatable pair of mechanical fasteners used in a pneumatic tire of an embodiment of the present technology engage with each other while sandwiching two rubber-coated fiber reinforced members.
Figure 3B:
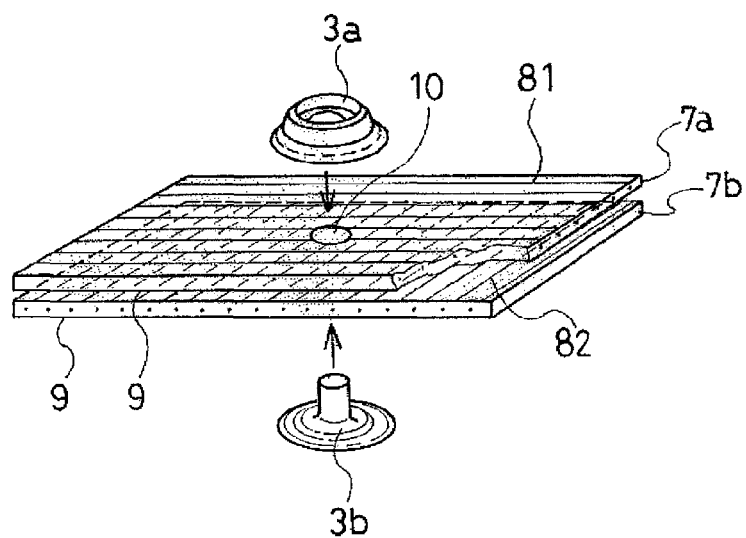

FIGS. 3A and 3B are partially fragmented perspective model diagrams for explaining the configuration of the two members 3a, 3b that compose the first mechanical fastener 3 of the separatable pair of mechanical fasteners of how they engage with each other while sandwiching two rubber-coated fiber reinforced members 7a, 7b. FIG. 3A illustrates the fiber reinforced member 7 in which fiber bundles 81 of the fiber reinforced member 7a and fiber bundles 82 of the fiber reinforced member 7b are disposed in alignment in a manner such that their respective directions intersect at an angle of approximately 45 degrees and are disposed in respective rubber coatings 9. FIG. 3B illustrates the fiber reinforced member 7 in which the fiber bundles 81 of the fiber reinforced member 7a and the fiber bundles 82 of the fiber reinforced member 7b are disposed in a manner such that their respective directions intersect at an angle of approximately 90 degrees.

In the present technology, "mechanical fastener" is a mechanical fastener basically similar to that described in Japanese Unexamined Patent Application Publication Nos. 2012-025318A and 2012-240465A described above, and refers to a pair of fasteners 3 configured to be separatable and so that engagement and separation of the pair can be freely repeated. Exemplary types of such a mechanical fastener are those known as "hooks" or "snaps". Specific examples of products in the clothing industry that are generally included as mechanical fasteners are snap buttons, ring snaps, ring hooks, American snaps, American hooks, eyelet hooks, spring hooks, and jumper hooks.

Such mechanical fasteners differ from surface fasteners in that while an area of the engaging part of a surface fastener is unlimited in the entire area, the area of the engaging part of a mechanical fastener is small (preferably from approximately 1 to 115 mm², and more preferably from approximately 4 to 90 mm², for example). In other words, the mechanical fastener is a point fastener. Thus, even when engaged at a small area of from approximately 1 to 115 mm² for example, due to a mechanical male-female structure or the like, strong engaging is achieved. Thus, a conventional structure for the mechanical fastener may be used. The mechanical fastener may be made from a metal, a rubber, a synthetic resin material, or the like.

According to an embodiment of the present technology, a pneumatic tire that includes a mechanical fastener with great attachment strength to the tire inner surface that can effectively secure a desired functional object having a specific function and certain characteristics (mass, size, form, and the like) for an extended period of time can be achieved. The mechanical fastener has the configuration in which, the mechanical fastener 3 is disposed at a position such that the distance D in the tire width direction from the center position C of the mechanical fastener 3 to the tire equator line CL and the maximum width W (mm) of the tire satisfying the following relationship:

$$0 \leq D/W \leq 0.40,$$

the at least two fastener members 3a, 3b fix together while sandwiching the fiber reinforced member 7, the fiber reinforced member 7 includes a plurality of fiber bundles 8 disposed in alignment in at least one direction, and the fiber reinforced member 7 have the number of fiber bundles Y (bundles/50 mm width) per unit width of the fiber reinforced member such that:

$$20 \leq Y \text{ (bundles/50 mm width)} \leq 90.$$

As a result of this configuration, the obtained engagement force of the mechanical fastener is great and is essentially free of variations (positional variation within the tire and variation from tire to tire). Furthermore, the engagement force deteriorates/declines minimally over time due to extreme usage conditions including deformation and compaction of the tire inner surface caused by high speed tire rolling motion in a state of relatively elevated temperatures being repeated for an extended period of time.

In particular, in cases of mechanical fasteners in which only the engagement force is great and the attachment strength to the tire inner surface is low, as the service life of the tire continues, a functional object attached to the tire inner surface will fail to retain its proper position on the tire inner surface or its original correctly disposed form. This leads to the function of the functional object ceasing, and thus such configurations are not desirable.

In order to ensure the attachment strength of the mechanical fastener to the tire inner surface is sufficiently high, the at least two fastener members 3a, 3b should be fix together while sandwiching the rubber-coated fiber reinforced member 7, the fiber reinforced member 7 should include a plurality of fiber bundles 8 disposed in alignment in at least one direction, and the fiber reinforced member 7 should have the number of fiber bundles Y (bundles/50 mm width) per unit width of the fiber reinforced member such that:

$20 \leq Y$ (bundles/50 mm width) $\leq 90$. Embodiments in which the number of fiber bundles Y (bundle/50 mm width) per unit width of the fiber reinforced member is less than 20 bundles/50 mm width are not preferred because the effect of increasing the attachment strength obtained by disposing the fiber reinforced member is not obtained. Embodiments in which the number of fiber bundles Y is greater than 90 bundles/50 mm width are typically not preferable because the difference in rigidity between the regions of the tire inner surface with and without the fiber reinforced member becomes excessive.

Additionally, as illustrated in FIGS. 1A and 1B, the position where the mechanical fastener 3 is disposed should be at a position such that a distance D (mm) in a tire width direction from a center position C of the mechanical fastener 3 to the tire equator line CL and the maximum width W (mm) of the tire satisfy the following relationship:

$$0 \leq D/W \leq 0.40.$$

In particular, when the mechanical fastener is used to attach an object having a specific function with a height of 15 mm or greater, pendular movement of the object due to the distortion of the tire inner surface is likely to occur. Thus the relationship described above of $0 \leq D/W \leq 0.40$ should be satisfied. The position where the mechanical fastener 3 is disposed should be such that the relationship $0 \leq D/W \leq 0.40$ is satisfied, because the distortion of the tire inner surface during tire rolling motion is relatively small within the region (in particular, distortion in a tire width direction is small), and thus an object having a specific function is unlikely to fall off.

Additionally, the fiber reinforced member should be rubber coated. In the tire vulcanization process, the rubber of the tire and the rubber-coated fiber reinforced member strongly vulcanization-bond together, and the rubber in between the fibers of the fiber reinforced member vulcanizes so that the fiber reinforced member and the mechanical fastener are strongly adhered and bonded to the tire inner surface.

In the pneumatic tire according to an embodiment of the present technology, the desired object is attached to the inner surface by the engagement of the pair of mechanical fasteners. Accordingly, the obtained physical engagement force is great and the strength of the force is free of variations (positional variation within the tire and variation from tire to tire). Furthermore, the engagement force deteriorates/declines minimally over time due to extreme usage conditions being repeated for an extended period of time. Accordingly, a desired engagement force can be ensured for an extended period of time, and the object attached to the inner surface can function for an extended period of time.

Accordingly, positioning of the object to be attached at an engagement position (point of engagement) of the tire inner surface is performed by automatically and precisely disposing the fastener at a corresponding position on the tire inner surface. Therefore, it is possible to easily accommodate cases where a high level of precision is required in disposing the object at a position (placement position). This is of great significance because positioning is performed on the tire inner surface, a narrow, curved, surface in three-dimensional space.

The fiber bundles that compose the fiber reinforced member preferably have a Young's modulus of from 1 GPa to 15 GPa. By employing fiber bundles with a Young's modulus within this range, the rubber-coated fiber reinforced member can be made of relatively flexible rubber composite material and can have superior durability due to being able to better deform in accordance with the repeated rolling distortion caused by the rolling motion of the tire. Examples include fiber bundles made of nylon 6, which have a Young's modulus of 4 GPa, which is within a more preferred range for the Young's modulus of from 2 GPa to 8 GPa.

In an embodiment of the present technology, the fiber reinforced member should include a plurality of fiber bundles disposed in alignment in at least one direction. The reason for this is the repeated rolling distortion caused by the rolling motion of the tire typically has at least one substantially fixed directional element to it. In particular, at the equator and the region nearby, circumferential rolling distortion is greater than lateral distortion.

Known types of rolling distortion repeatedly experienced due to the rolling motion of the tire are circumferential distortion and lateral distortion. To counter the distortion in these direction, the fiber reinforced member more preferably includes a plurality of fiber bundles disposed in alignment in at least two directions (FIGS. 2B, 3A, and 3B).

In both embodiments with the fiber bundles aligned in one direction and embodiments with the fiber bundles aligned in at least two direction, the direction of alignment of the fiber bundles in the fiber reinforced member described above preferably at least forms an angle (minor angle θ) with the tire circumferential direction such that:

$$15 \text{ degrees} \leq \theta \leq 75 \text{ degrees}.$$

In an embodiment of the present technology, as described above, the mechanical fastener is disposed at a position such that:

$$0 \leq D/W \leq 0.40 \text{ is satisfied.}$$

In this region, the rolling distortion repeatedly experience due to the rolling motion of the tire includes circumferential distortion and lateral distortion. In particular, at the tire equator and the region nearby, the circumferential distortion is greater than the lateral distortion. Thus it is effective to dispose the fiber bundles with an arrangement direction at an angle with respect to the tire circumferential direction. This angle (minor angle θ) formed with the tire circumferential direction is preferably such that:

15 degrees≤θ≤75 degrees. This reduces the stress caused by distortion and enables the disposed fiber reinforced member 7 to have a greater effect.

According to the knowledge of the present inventors, the angle (minor angle θ) formed with the tire circumferential direction is more preferably such that:

$$30 \text{ degrees} \leq \theta \leq 60 \text{ degrees},$$

and the region where the mechanical fastener is disposed is more preferably such that:

$$0 \leq D/W \leq 0.2.$$

Figure 4A:
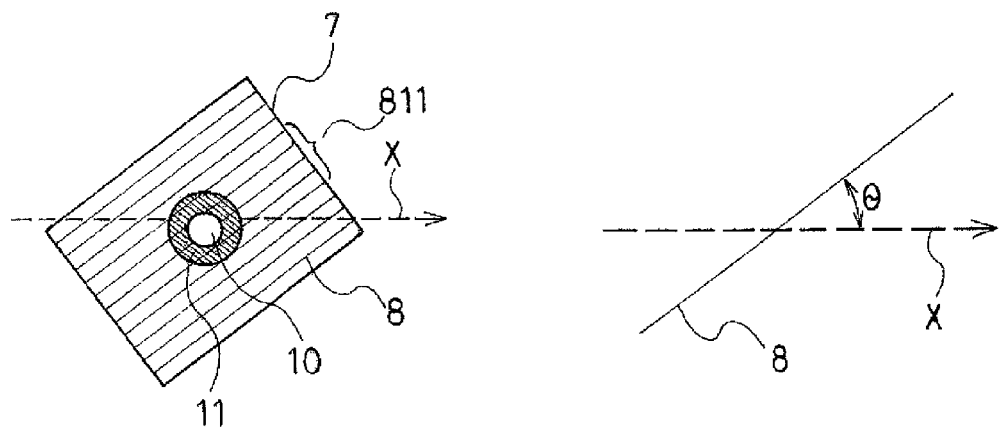
FIGS. 4A and 4B are model diagrams for explaining an angle θ formed between a direction of alignment of fiber bundles in a fiber reinforced member and a tire circumferential direction X.
Figure 4B:
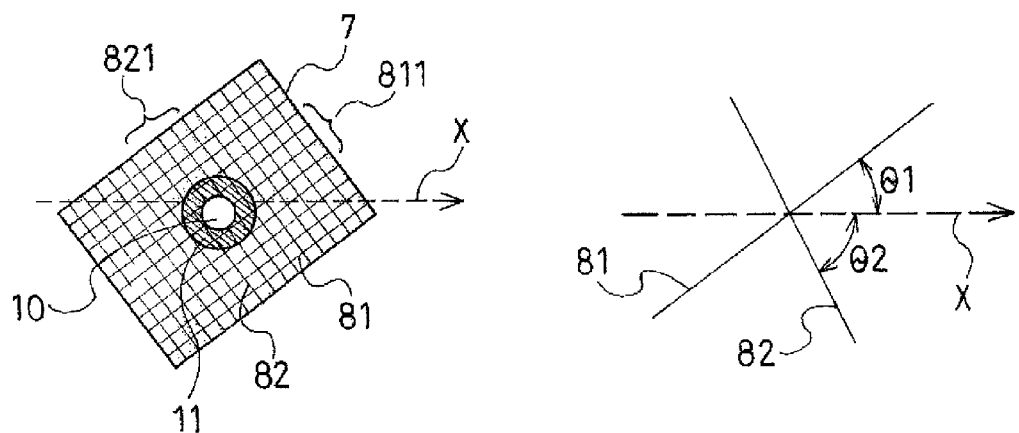

These relationships are explained below using the model diagrams of FIGS. 4A and 4B. FIG. 4A illustrates an embodiment like that illustrated in FIG. 2A in which the fiber bundles 8 are aligned in one direction. The direction of the fiber bundles 8 aligned in one direction with respect to the tire circumferential direction forms an angle (minor angle) θ with the tire circumferential direction. The diagram to the right of FIG. 4A is an enlarged model diagram of the diagram to the left of FIG. 4A. FIG. 4B illustrates an embodiment like that illustrated in FIGS. 3A and 3B in which the fiber bundles 81, 82 are aligned in two directions. The direction of the fiber bundles 81 with respect to the tire circumferential direction X forms an angle (minor angle) θ1 with the tire circumferential direction, and the direction of the fiber bundles 82 with respect to the tire circumferential direction X forms an angle (minor angle) θ2 with the tire circumferential direction. The diagram to the right of FIG. 4B is an enlarged model diagram of the diagram to the left of FIG. 4B.

As illustrated in FIG. 4B, in embodiments of the fiber reinforced member 7 in which at least the fiber bundles 81, 82 are aligned in at least two directions, at least one of the angles (minor angles) θ1, θ2 formed with the tire circumferential direction is preferably such that:

15 degrees≤θ≤75 degrees.

The fibers that compose the fiber reinforced member are preferably made of chemical fibers or long-length fibers (filament fibers) of synthetic fiber to ensure good physical properties and stable quality. Made of these, a sheet with fibers laid in parallel, a cord fabric, a plain weave fabric, and the like with a density of approximately from 20 g/m$^2$ to 300 g/m$^2$ are particularly preferably used, from the perspective of high strength and high durability. In particular, the density is preferably within the range described above because in such an embodiment, attachment durability can be ensured and rubber can easily enter between the fibers and between the fiber bundles, thus facilitating the formation of a strong vulcanization bond. The density is more preferably from 30 g/m$^2$ to 200 g/m$^2$. The fiber is preferably a chemical or synthetic fiber such as rayon fiber, nylon fiber, polyester fiber, or polyethylene fiber to ensure stable procurement and high quality.

"Fiber bundle" refers to a unit which is a plurality of fibers collected together as one strand. Alternatively, it may refer to a single unit which is a composite structure of a plurality of strands grouped or twisted together.

In an embodiment of the present technology, the average length L (mm) of the fiber bundles in the fiber reinforced member that pass through a fastener region 11 where the fastener 3 projects on the tire inner surface is preferably such that:

15≤L (mm)≤200. Referring to FIGS. 4A and 4B, the fiber bundles that pass through the fastener region 11 where the fastener 3 projects on the tire inner surface are denoted by 811 in FIG. 4A and 811, 821 in FIG. 4B. Each of these fiber bundles are divided by a hole 10 for receiving the mechanical fastener 3 provided on the fiber reinforced member 7. The average length L (mm) of the lengths of the divided fiber bundles in the fiber reinforced member is preferably within the range:

15≤L (mm)≤200. The length of the fiber bundles that function to suppress the mechanical fastener to the tire inner surface has a minimum value to ensure stable fixing strength. According to the present inventors, this minimum value is 15 mm. If the length of the fiber bundles is too great, the stress caused by distortion increases, leading to the possibility of the fastener and attached object falling off. Thus, according to the present inventors, the maximum value is 200 mm. To obtain a sufficient attachment strength of the fastener, the length L is more preferably within the range:

60≤L (mm)≤90.

Figure 5:
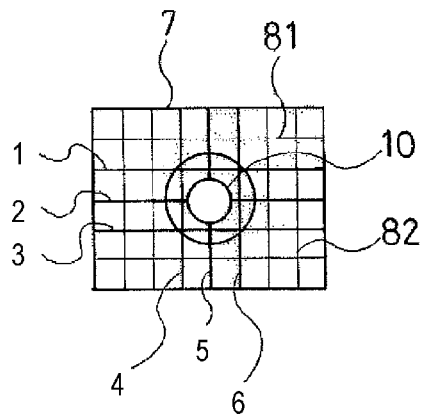
FIG. 5 is a plan view for explaining a preferred embodiment of the fiber reinforced member 7 able to be used in embodiments of the present technology, and in particular for explaining the number of fiber bundles.
Figure 6A:
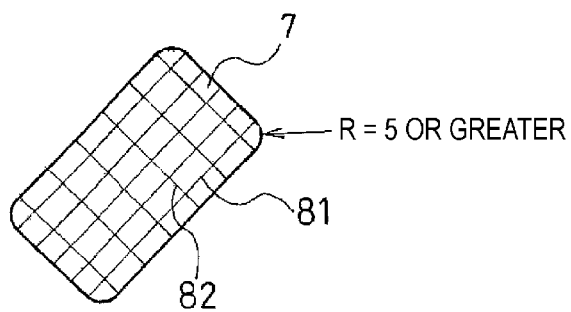
FIGS. 6A to 6D are plan views for explaining preferred shapes of the fiber reinforced member 7 able to be used in embodiments of the present technology, and in particular for explaining the contour shapes when the fiber reinforced member 7 is viewed in a plan view.
Figure 6B:
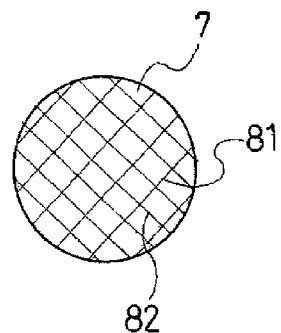
Figure 6C:
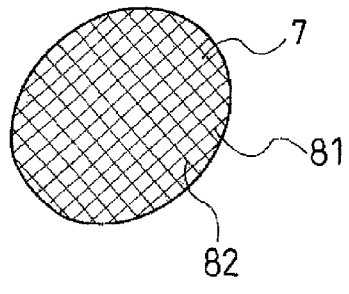
Figure 6D:
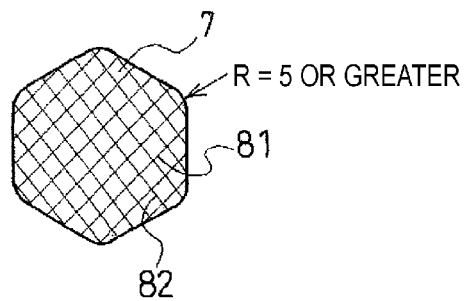

Additionally, the number of fiber bundles in the fiber reinforced member 7 that pass through the fastener region 11 where the fastener projects on the tire inner surface is preferably from 4 to 90. The fiber reinforced member that functions to constrain the mechanical fastener to the tire inner surface has a lower limit to the number of fiber bundles to ensure more stable fixing strength. Also, there is an upper limit to the number of fiber bundles to ensure the flexibility of the fiber reinforced member and prevent the fastener and attached object from falling off. Accordingly, the number of fiber bundles is preferably from 4 to 90 and more preferably from 8 to 30. "Number of fiber bundles in the fiber reinforced member 7 that pass through a fastener region 11" refers to the total number of fiber bundles that pass through the region in any direction. For example, in the embodiment illustrated in the model diagram of FIG. 5, the number is 6 as indicated by the italicized numbers.

Additionally, the fiber reinforced member 7 preferably has a contour shape when viewed in a plan view without sharp corner portions and composed of a curved line with a radius of curvature of 5 mm or greater, or alternatively composed of a combination of a curved line with a radius of curvature of 5 mm or greater and a straight line. Specific examples of such shapes are illustrated in FIGS. 6A, 6B, 6C, and 6D. Preferred shapes include a rectangle or square with radiused corner portions, a circle, an ellipse, a regular polygon such as a regular hexagon with radiused corner portions, and the like.

Additionally, the contour shape of mechanical fastener 3, which projects on tire inner surface, preferably has a distance R of from 2 mm to 60 mm, where R is the distance from a center of gravity position to a discretionary position on the contour line furthest away from the center of gravity position. To ensure the fixing strength of the fastener, the fastener mounted on the tire inner surface has a lower limit to its diameter. Also, there is also an upper limit to alleviate the possibility of vulcanization defects when producing the pneumatic tire that may occur if the diameter is too great. According to the knowledge of the present inventors, the distance R is preferably from 2 mm to 60 mm. In FIGS. 7A, 7B, 7C, and 7D illustrate the distance R from the center of gravity position to a discretionary position on the contour line furthest away from the center of gravity position of a circle, a triangle, an ellipse, and a cog shape, respectively.

An adhesion area S (cm$^2$) of the fiber reinforced member 7 to the tire inner surface is preferably such that the following is satisfied:

12≤S (cm$^2$)≤300. An adhesion area S of greater than 300 cm$^2$ leads to increase stress caused by distortion and thus more chance of members falling off. An adhesion area S of less than 12 cm$^2$ makes it difficult to obtain a stable fixing strength.

According to embodiments of the present technology, the object attached to a second fastener of the pair of mechanical fasteners can be disposed on an inner surface of a pneumatic tire by engaging the second fastener with the counterpart fastener 3 disposed on the tire inner surface side.

The object attached to the second fastener has various functions in line with the increasingly high-tech development of recent pneumatic tires. Exemplary examples of such objects include: (a) an electronic circuit including a sensor, (b) a balance weight, (c) a run-flat core, (d) an object on which an oxygen scavenger, a drying agent, and/or an ultraviolet light detecting color fixing agent is applied or mounted, (e) a noise absorbing member, (f) a surface fastener member, and the like, and a combination or two or more thereof.

EXAMPLES

Working Examples 1 to 8 and Comparative Examples 1 to 3

As the mechanical fastener members of the examples, a mechanical fastener member 3 with the configuration illustrated in FIG. 7A was used, the fiber reinforced member had specifications varying as shown in Table 1 and with the configurations illustrated in FIGS. 2A and 3B. A single mechanical fastener member 3 was disposed on the inner surface of a pneumatic tire (195/65R15) on the equator portion of the inner surface of the tread portion, and in the vulcanization molding of the tire, the mechanical fastener member was vulcanization bonded thereto. The maximum width of the pneumatic tires was 195 mm (Working Examples 1 to 8, Comparative Examples 1 to 3).

The position where the fastener was fixed, the form of the fiber reinforced member, and the like varied as shown in Table 1.

TABLE 1

|  | Comparative Example 1 | Working Example 1 | Working Example 2 | Working Example 3 | Working Example 4 | Working Example 5 |
|---|---|---|---|---|---|---|
| Mechanical fastener fixing position D(mm) | 0 mm | 0 mm | 0 mm | 0 mm | 0 mm | 0 mm |
| Ratio D/W | 0 | 0 | 0 | 0 | 0 | 0 |
| Number of fiber bundles in fiber reinforced member Y (Bundles/50 mm width) | 0 (only rubber) | 50 | 50 | 50 | 50 | 50 |
| Area A per one fiber bundle in the fiber reinforced member (mm$^2$) | 0 (only rubber) | 0.04 | 0.10 | 0.10 | 0.10 | 0.10 |
| Reinforcing fiber | N/A | Polyethylene | Polyethylene | Nylon 6 | Nylon 6 | Nylon 6 |
| Young's modulus of reinforcing fiber bundle | N/A | 0.2 | 0.2 | 4 | 4 | 4 |
| Number of fiber reinforced members | N/A | One member | One member | One member | Two members | Two members |
| Fiber bundle direction in fiber reinforced member | — | 1 member 1 direction | 1 member 1 direction | 1 member 1 direction | 2 members 2 directions | 2 members 2 directions |
| Angle θ between tire circumferential direction and fiber bundle | — | 0 degree | 0 degree | 0 degree | 0 degree 90 degrees | 45 degrees 45 degrees |
| Average length L of fiber bundles (mm) | — | 10 | 10 | 10 | 10 | 10 |
| Number of fiber bundles passing through fastener region | — | 3 | 3 | 3 | 3 | 3 |
| Fastener contour shape | Quadrangle | Quadrangle | Quadrangle | Quadrangle | Quadrangle | Quadrangle |
| Distance R (mm) | 5 | 5 | 5 | 5 | 5 | 5 |
| Durability | 100 | 110 | 115 | 120 | 120 | 125 |

|  | Working Example 6 | Working Example 7 | Working Example 8 | Comparative Example 2 | Comparative Example 3 |
|---|---|---|---|---|---|
| Mechanical fastener fixing position D(mm) | 0 mm | 0 mm | 0 mm | 0mm | 90 mm |
| Ratio D/W | 0 | 0 | 0 | 0 | 0.45 |
| Number of fiber bundles in fiber reinforced member Y (Bundles/50 mm width) | 50 | 50 | 50 | 10 | 10 |
| Area A per one fiber bundle in the fiber reinforced member (mm$^2$) | 0.10 | 0.10 | 0.10 | 0.04 | 0.04 |
| Reinforcing fiber | Nylon 6 | Nylon 6 | Nylon 6 | Polyethylene | Polyethylene |
| Young's modulus of reinforcing fiber bundle | 4 | 4 | 4 | 0.2 | 0.2 |
| Number of fiber reinforced members | Two members | Two members | Two members | Two members | Two members |
| Fiber bundle direction in fiber reinforced member | 2 members 2 directions | 2 members 2 directions | 2 members 2 directions | 2 members 2 directions | 2 members 2 directions |
| Angle θ between tire circumferential direction and fiber bundle | 45 degrees 45 degrees | 45 degrees 45 degrees | 45 degrees 45 degrees | 45 degrees 45 degrees | 45 degrees 45 degrees |
| Average length L of fiber bundles (mm) | 30 | 30 | 30 | 10 | 10 |
| Number of fiber bundles passing through fastener region | 3 | 10 | 10 | 3 | 3 |
| Fastener contour shape | Quadrangle | Quadrangle | Circle | Quadrangle | Quadrangle |
| Distance R (mm) | 5 | 10 | 10 | 5 | 5 |
| Durability | 130 | 135 | 140 | 105 | 102 |

The fasteners were evaluated for durability test as per the test described below.

(1) Fastener Durability Test

The mechanical fastener on the tire inner surface of the test tires and the counterpart mechanical fastener with a 100 g weight attached were fixed together. In this state, a durability test where the test tires were ran on a drum was performed. The running distance until the fastener on the tire inner surface fell off the inner surface was found. The results of the working examples and comparative examples were expressed as index values with the running distance of Comparative Example 1, which used a rubber sheet instead of the fiber reinforced member, defined as 100. Index values greater than 100 indicate superior performance and that a long distance was run. The conditions of the mandatory tests were:

the air pressure of the test tires (195/65R15) was 210 kPa, the running speed was 81 km/h, and 13% of the maximum load was added every 2 hours.

As can be seen from the obtained results of the test tires, the pneumatic tires according to the embodiments of the present technology had a greatly superior fixing strength for the mechanical fasteners.

The invention claimed is:

1. A pneumatic tire, comprising:
   first mechanical fasteners disposed on a tire inner surface and separated from each other, each of the first mechanical fasteners being one of a separatable pair of mechanical fasteners and being composed of at least two fastener members; wherein
   a) the at least two fastener members constituting each of the first mechanically members respectively sandwich a rubber-coated fiber reinforced member and fix together, and the rubber-coated fiber reinforced members sandwiched between each of the at least two fastener members are separated from each other;
   b) the first mechanical fasteners are disposed at a position such that a distance D (mm) in a tire width direction from a center position C of the first mechanical fasteners to a tire equator line L and a maximum width W (mm) of the tire satisfy a following relationship:

$0 \leq D/W \leq 0.40$; and c) the fiber reinforced member includes a plurality of fiber bundles disposed in alignment in at least one direction, a number of fiber bundles Y (bundles/50 mm width) per unit width of the fiber reinforced member being such that:

$20 \leq Y$ (bundles/50 mm width) $\leq 90$;

wherein the contour shape of the fastener which projects on the tire inner surface has a distance R of from 8 mm to 60 mm, where R is a distance from a center of gravity position of the contour shape to a discretionary position on a line of the contour furthest away from the center of gravity position.

2. The pneumatic tire according to claim 1, wherein the fiber reinforced member is composed of fiber bundles with a fiber total cross-sectional area A ($mm^2$/fiber bundle) per one fiber bundle such that:

$0.05 \leq A$ ($mm^2$/fiber bundle) $\leq 1.20$.

3. The pneumatic tire according to claim 1, wherein the fiber reinforced member is composed of fiber bundles with a Young's modulus of from 1 GPa to 15 GPa.

4. The pneumatic tire according to claim 1, wherein the fiber reinforced member is composed of a plurality of fiber bundles aligned in one direction.

5. The pneumatic tire according to claim 1, wherein the fiber reinforced member is composed of a plurality of fiber bundles aligned in at least two directions.

6. The pneumatic tire according to claim 5, wherein a plurality of fiber reinforced members composed of a plurality of fiber bundles aligned in one direction are layered with the plurality of fiber bundles having intersecting alignment directions so as to have a configuration in which the fiber bundles are aligned in at least two directions.

7. The pneumatic tire according to claim 5, wherein the direction in which the fiber bundles in the fiber reinforced member are aligned forms an angle (minor angle θ) with a tire circumferential direction such that:

15 degrees $\leq \theta \leq 75$ degrees.

8. The pneumatic tire according to claim 1, wherein an average length L (mm) of the fiber bundles in the fiber reinforced member that pass through a fastener region where the fastener projects on the tire inner surface is such that:

$15 \leq L$ (mm) $\leq 200$.

9. The pneumatic tire according to claim 1, wherein a number of the fiber bundles in the fiber reinforced member that pass through the fastener region where the fastener projects on the tire inner surface is from 4 to 90.

10. The pneumatic tire according to claim 1, wherein the fiber reinforced member sandwiched between the at least two fastener members has a contour shape when viewed in a plan view without sharp corner portions, and is composed of a curved line with a radius of curvature of 5 mm or greater or composed of a combination of a curved line with a radius of curvature of 5 mm or greater and a straight line.

11. The pneumatic tire according to claim 1, further comprising an object attached to a second fastener that engages with the first fastener on the tire inner surface, wherein the object is fixed on the tire inner surface by engaging the first fastener and the second fastener together.

12. The pneumatic tire according to claim 11, wherein the object attached to the second fastener is one or a combination of two or more selected from the group consisting of: (a) an electronic circuit comprising a sensor, (b) a balance weight, (c) a run-flat core, (d) an object on which an oxygen scavenger, a drying agent, and/or an ultraviolet light detecting color fixing agent is applied or mounted, (e) a noise absorbing member, and (f) a surface fastener member.

13. The pneumatic tire according to claim 1, wherein the number of fiber bundles Y (bundles/50 mm width) per unit width of the fiber reinforced member satisfies:

$45 \leq Y$ (bundles/50 mm width) $\leq 90$.

* * * * *